(12) United States Patent
Bilow

(10) Patent No.: US 7,552,402 B2
(45) Date of Patent: Jun. 23, 2009

(54) INTERFACE ORIENTATION USING SHADOWS

(75) Inventor: Charles Bilow, North Bend, WA (US)

(73) Assignee: Microsoft Corporation, Redmond, WA (US)

(*) Notice: Subject to any disclaimer, the term of this patent is extended or adjusted under 35 U.S.C. 154(b) by 152 days.

(21) Appl. No.: 11/425,843

(22) Filed: Jun. 22, 2006

(65) Prior Publication Data
US 2007/0300182 A1   Dec. 27, 2007

(51) Int. Cl.
*G06F 3/048* (2006.01)
*G06F 3/041* (2006.01)

(52) U.S. Cl. .................. 715/862; 715/863; 715/861; 715/856; 715/857; 715/858; 715/859; 715/860; 715/781; 715/782; 715/783; 715/784; 715/785; 715/786; 715/787; 715/788; 345/173

(58) Field of Classification Search .......... 715/856, 715/857, 858, 859, 860, 861, 781, 783, 784, 715/785, 786, 787, 788; 345/173
See application file for complete search history.

(56) References Cited

U.S. PATENT DOCUMENTS

| | | | |
|---|---|---|---|
| 5,230,063 | A | 7/1993 | Hoeber et al. |
| 5,423,554 | A | 6/1995 | Davis |
| 5,434,964 | A | 7/1995 | Moss et al. |
| 5,665,951 | A | 9/1997 | Newman et al. |
| 5,714,698 | A | 2/1998 | Tokioka et al. |
| 5,804,803 | A | 9/1998 | Cragun et al. |
| 5,910,653 | A | 6/1999 | Campo |
| 5,943,164 | A | 8/1999 | Rao |

(Continued)

FOREIGN PATENT DOCUMENTS

WO        0050979        8/2001

(Continued)

OTHER PUBLICATIONS

Noi Sukaviriya et al., "Augmenting a Retail Environment Using Steerable Interactive Displays", 2 pages, http://www.research.ibm.com/ed/publications/chi03b.pdf, date unknown.

(Continued)

*Primary Examiner*—Sy D Luu
*Assistant Examiner*—Rashawn Tillery
(74) *Attorney, Agent, or Firm*—Merchant & Gould; Ryan T. Grace

(57) ABSTRACT

A graphical user interface system may position and orient a user interface element to be displayed on an optically-sensitive display surface. The position of the object may be based on the position of a point of contact that an object (e.g., a person's finger, a block of wood, etc.) makes against the display surface. The orientation of the object may be determined using the shadow cast by the object on the surface. An axis may be determined between the shadow and the point of contact, and the axis may be used as a frame of reference (e.g., a vertical axis) for the orientation of the interface element. Further movement of the object and/or shadow can either result in further movement/reorientation of the interface, or as an actual input to the interface. If used for an actual input, the interface may be fixed at its initial position and orientation to allow the additional movement to be interpreted.

20 Claims, 13 Drawing Sheets

U.S. PATENT DOCUMENTS

| | | | |
|---|---|---|---|
| 6,159,100 | A | 12/2000 | Smith |
| 6,181,343 | B1 | 1/2001 | Lyons |
| 6,247,128 | B1 | 6/2001 | Fisher et al. |
| 6,333,735 | B1 | 12/2001 | Anvekar |
| 6,445,364 | B2 | 9/2002 | Zwern |
| 6,452,593 | B1 | 9/2002 | Challener |
| 6,512,507 | B1 | 1/2003 | Furihata |
| 6,568,596 | B1 | 5/2003 | Shaw |
| 6,577,330 | B1 | 6/2003 | Tsuda et al. |
| 6,624,833 | B1 | 9/2003 | Kumar |
| 6,662,365 | B1 | 12/2003 | Sullivan et al. |
| 6,667,741 | B1 | 12/2003 | Kataoka et al. |
| 6,672,961 | B1 | 1/2004 | Uzun |
| 6,735,625 | B1 | 5/2004 | Ponna |
| 6,745,234 | B1 | 6/2004 | Philyaw et al. |
| 6,767,287 | B1 | 7/2004 | McQuaid et al. |
| 6,768,419 | B2 | 7/2004 | Garber et al. |
| 6,791,530 | B2* | 9/2004 | Vernier et al. ............... 345/156 |
| 6,792,452 | B1 | 9/2004 | Philyaw |
| 6,822,635 | B2 | 11/2004 | Shahoian et al. |
| 6,847,856 | B1 | 1/2005 | Bohannon |
| 6,910,076 | B2 | 6/2005 | Lortz |
| 6,950,534 | B2 | 9/2005 | Cohen et al. |
| 6,965,842 | B2 | 11/2005 | Rekimoto |
| 6,990,660 | B2 | 1/2006 | Moshir et al. |
| 7,085,590 | B2 | 8/2006 | Kennedy et al. |
| 7,104,891 | B2 | 9/2006 | Osako et al. |
| 2001/0054082 | A1 | 12/2001 | Rudolph et al. |
| 2002/0109737 | A1 | 8/2002 | Jaeger |
| 2002/0151337 | A1 | 10/2002 | Yamashita et al. |
| 2002/0154214 | A1 | 10/2002 | Scallie et al. |
| 2003/0025676 | A1 | 2/2003 | Cappendijk |
| 2003/0063132 | A1 | 4/2003 | Sauer et al. |
| 2003/0119576 | A1 | 6/2003 | McClintiock et al. |
| 2003/0234773 | A1 | 12/2003 | Sano et al. |
| 2004/0005920 | A1 | 1/2004 | Soltys et al. |
| 2004/0032409 | A1 | 2/2004 | Girard |
| 2004/0046784 | A1 | 3/2004 | Shen |
| 2004/0051733 | A1 | 3/2004 | Katzie |
| 2004/0090432 | A1 | 5/2004 | Takahashi et al. |
| 2004/0127272 | A1 | 7/2004 | Park et al. |
| 2004/0212617 | A1 | 10/2004 | Fitzmaurice |
| 2005/0054392 | A1 | 3/2005 | Too |
| 2005/0069188 | A1 | 3/2005 | Rubbert et al. |
| 2005/0110781 | A1* | 5/2005 | Geaghan et al. ............. 345/180 |
| 2005/0134578 | A1 | 6/2005 | Chambers et al. |
| 2005/0146508 | A1 | 7/2005 | Kirkland et al. |
| 2005/0162402 | A1 | 7/2005 | Watanachote |
| 2005/0168448 | A1* | 8/2005 | Simpson ..................... 345/173 |
| 2005/0177054 | A1 | 8/2005 | Yi et al. |
| 2005/0183035 | A1 | 8/2005 | Ringel |
| 2005/0193120 | A1 | 9/2005 | Taylor |
| 2005/0200291 | A1 | 9/2005 | Naugler et al. |
| 2005/0248729 | A1 | 11/2005 | Drucker et al. |
| 2005/0251800 | A1 | 11/2005 | Kurlander et al. |
| 2005/0253872 | A1 | 11/2005 | Goss et al. |
| 2005/0277071 | A1 | 12/2005 | Yee |
| 2005/0280631 | A1 | 12/2005 | Wong et al. |
| 2006/0017709 | A1 | 1/2006 | Okano |
| 2006/0026535 | A1 | 2/2006 | Hotelling |
| 2006/0075250 | A1 | 4/2006 | Liao |
| 2006/0156249 | A1* | 7/2006 | Blythe et al. ................ 715/781 |
| 2006/0161871 | A1* | 7/2006 | Hotelling et al. ............ 715/863 |
| 2006/0244734 | A1* | 11/2006 | Hill et al. .................... 345/173 |
| 2007/0188518 | A1 | 8/2007 | Vale et al. |
| 2007/0220444 | A1 | 9/2007 | Sunday et al. |
| 2007/0236485 | A1 | 10/2007 | Trepte |
| 2007/0284429 | A1 | 12/2007 | Beeman |
| 2007/0300307 | A1 | 12/2007 | Duncan |
| 2008/0040692 | A1 | 2/2008 | Sunday et al. |
| 2008/0174570 | A1* | 7/2008 | Jobs et al. ................... 345/173 |

FOREIGN PATENT DOCUMENTS

| | | |
|---|---|---|
| WO | WO 0236225 | 5/2002 |
| WO | WO 2005040944 | 5/2005 |
| WO | WO 20050122557 | 12/2005 |
| WO | 2006003586 | 1/2006 |

OTHER PUBLICATIONS

Chia Shen et al., "DiamondSpin: An Extensible Toolkit for Around-the-Table Interaction", 8 pages, http://hci.stanford.edu/publications/2004/diamondspin/diamondspin.pdf, Apr. 2004.

Andrew D. Wilson, "PlayAnywhere: A Compact Interactive Tabletop Projection—Vision System", 10 pages, http://research.microsoft.com/~awilson/papers/Wilson%20PlayAnywhere%20UIST%202005.pdf, Oct. 2005.

Sasaki et al., "Hands-Free User Interface for Seamless Collaborative Works in Shared MR Space", date unknown, 6 pp.

Krishna et al., "23.3: Tactile Sensor Based on Piezoelectric Resonance", 2002 IEEE, pp. 1643-1647.

http://www.softsland.com/Natural_Login_Pro.html, Apr. 13, 2006, 3pp.

Logitech, "SecureConnect: A Major Leap in the Cordless Desktop Experience", http://www.logitech.com/pub/pdf/bluetooth/secure_connect_whitepaper.pdf, received Apr. 7, 2006, 5pp.

Elzabadani et al., "Self-Sensing Spaces: Smart Plugs for Smart Environments", http://www.icta.ufl.edu/projects/publications/2005-ICOST-Selfsensingspaces.pdf, received Apr. 7, 2006, 8 pp.

Symantec, "Symantec Discovery: Track hardware/software assets and monitor license compliance throughout a multiplatform IT infrastructure", http://eval.veritas.com/mktginfo/enterprise/fact_sheets/ent-factsheet_discovery_12-2005.en.us/pdf, Dec. 2005, 5pp.

Leikas et al., "Virtual Space Computer Games with a Floor Sensor Control Human Centered Approach in the Design Process", http://www.dcs.gla.ac/uk/~stephen/workshops/haptic/papers/leikas.pdf, date unknown, 4 pp.

Tollmar et al. "Gesture + Play, Exploring Full-Body Navigation for Virtual Environments", http://people/csail.mit.edu/demirdji/papers/cvprhci-pg.pdf, date unknown, 8 pp.

Stoakley et al., "Virtual Reality on a WIM: Interactive Worlds in Miniature", Conference on Human factors in Computer Systems, Proceedings of the SIGCHI Conference on Human Factors in Computing Systems, ACM Press/Addison-Wesley Publishing Co., http://delivery.acm.org/10.1145/230000/223938/p265-stoakley.html?key1=223938&key2=5808034411&coll=GUIDE&dl=GUIDE&CFID=73042672&CFTOKEN=344092262, 1995, 14 pp.

Turk, "Perceptual User Interfaces ", http://ilab.cs.ucsb.edu/projects/turk/Turk&20DEC-NSF%20Workshop.pdt, date unknown, 10 pp.

Lee et al., "Modeling Virtual Object Behavior Within Virtual Environment", Virtual Reality Laboratory, Dept. of Computer Science and Engineering, pp. 41-48.

Nikitin et al., "Real-Time Simulation of Elastic Objects in Virtual Environments Using Finite Element Method and Precomputed Green's Functions", Eighth Eurographics Workshop on Virtual Environments, 2002, 6 pp.

TouchTable™, Northrop Grumman, www.northropgrumman.com, 2005, 2 pp.

TouchTable™, Northrop Grumman, http://www.ms.northropgrumman.com/touchtable.index.html, 2006, 2 pp.

U.S. Official Action mailed Mar. 3, 2008 in U.S. Appl. No. 11/278,264.

U.S. Official Action mailed Jul. 9, 2008 in U.S. Appl. No. 11/378,267.

U.S. Official Action mailed Jul. 10, 2008 in U.S. Appl. No. 11/423,883.

U.S. Official Action mailed Oct. 7, 2008 in U.S. Appl. No. 11/350,853.

U.S. Official Action mailed Dec. 2, 2008 in U.S. Appl. No. 11/278,264.

* cited by examiner

INTERFACE ORIENTATION USING SHADOWS

BACKGROUND

In today's digital world, the use of graphical user interfaces (GUIs) to display and manage computer information has become ubiquitous. For example, the WINDOWS™ (Microsoft Corporation, Redmond, Wash.) operating systems used in many personal computers employ a GUI desktop that displays information (e.g., text, images, etc.) for a user to view, and provides various icons or indicia with which the user may interact (e.g., a button, an Internet link, etc.). Software applications in these systems count on knowing, in advance, the position from which the user will be viewing the display screen, and will arrange and orient their graphical elements accordingly. For example, for a typical desktop computer, the applications assume that the user will be viewing the display with one particular edge being at the "top," and will orient text and images with that orientation in mind.

New applications opened on the system assume the same orientation for the display, and present their information aligned in the same manner as other applications (e.g., they share the same understanding of "up" and "down" as other applications on the system). This allows the same user to easily and accurately see the information for the various applications. However, such arrangements may include drawbacks.

SUMMARY

This Summary is provided to introduce a selection of concepts in a simplified form that are further described below in the Detailed Description. This Summary is not intended to identify key features or essential features of the claimed subject matter, or to limit the appended claims beyond their stated scope.

As described herein, a user interface element can be oriented on a computer display at a location that is determined by the placement of an object on or against the display, and at an orientation that depends on a shadow cast by the object on the display. To accomplish this, a shadow axis may be determined as a line running between the shadow and a point of contact between the object and the display. In some instances, the shadow axis can be displayed to give the user feedback on the orientation that is about to be used.

The interface element can be rotated, taking the shadow axis into consideration, so that the element can be readable by the person placing the object on the display.

The element can also be offset from the actual point of contact (or area of contact). For example, some interface elements may be located above and/or to the side of the point of contact. Other objects can have a variable offset, such as the current volume setting in an audio program.

In some instances, after the interface element is displayed, it can be further moved based on additional movement of the object and/or shadow. For example, further rotation of the shadow can cause re-orientation of the interface element. Movement of the object across the display can cause further corresponding movement of the interface element. Or, the interface can become anchored at its initial position, and further movement can be interpreted as input to the interface (e.g., selecting a new menu option, volume level, etc.).

Various types of interface elements can be used, such as menus, dialog boxes, slider bars, etc. Some interfaces can be radial in nature, and may be centered about the point (or area) of contact.

These and other features will be described in greater detail below.

DETAILED DESCRIPTION

Figure 1:
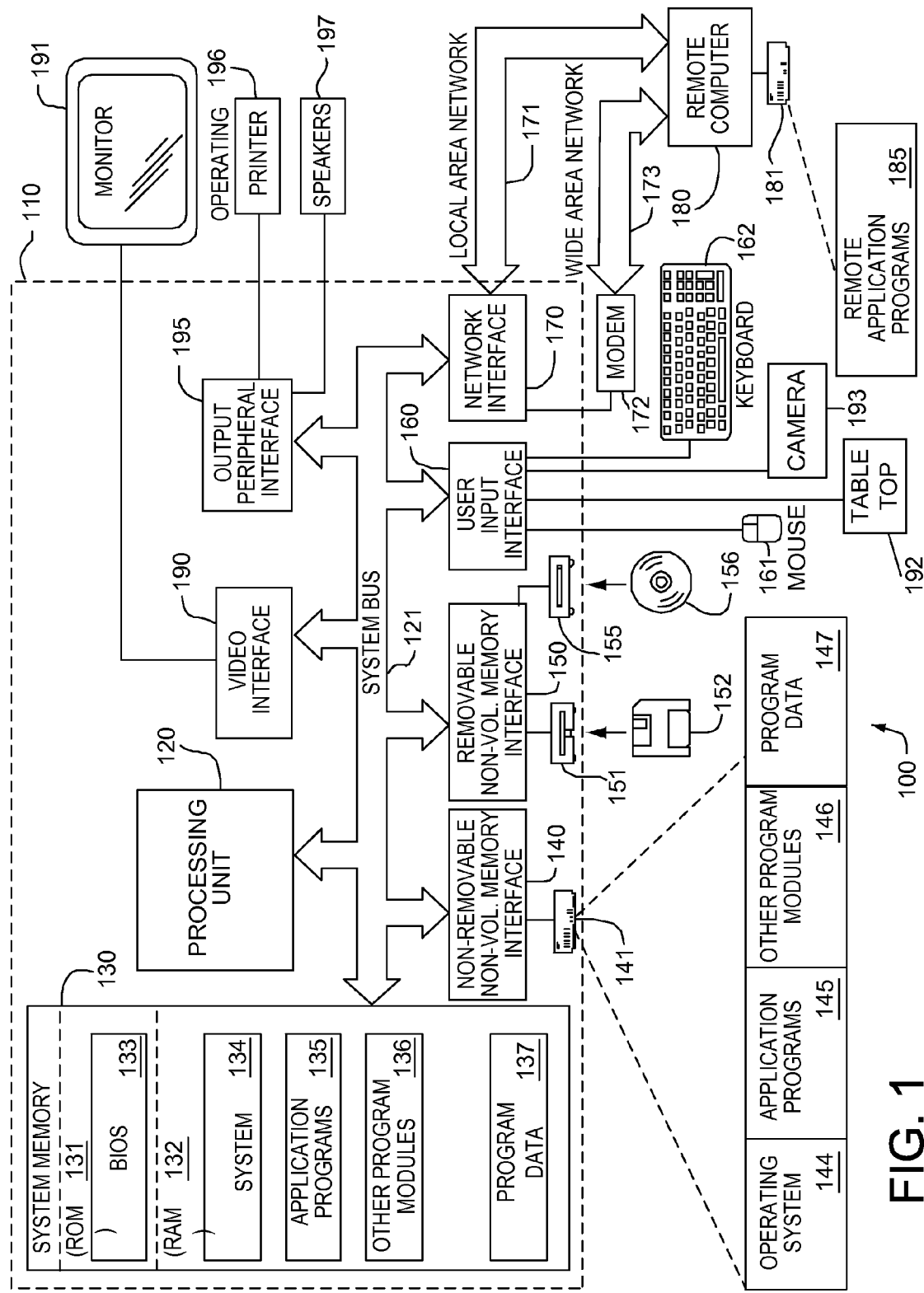
FIG. 1 illustrates an example computing environment in which features described herein may be implemented.

FIG. 1 illustrates an example of a suitable computing system environment 100 on which the features herein may be implemented. The computing system environment 100 is only one example of a suitable computing environment and is not intended to suggest any limitation as to the scope of use or functionality of the features described herein. Neither should the computing environment 100 be interpreted as having any dependency or requirement relating to any one or combination of components illustrated in the exemplary operating environment 100.

The features herein are described in the general context of computer-executable instructions, such as program modules, being executed by a computer. Generally, program modules include routines, programs, objects, components, data structures, etc. that can perform particular tasks or implement particular abstract data types. Moreover, those skilled in the art will appreciate that the features may be practiced with other computer system configurations, including hand-held devices, multiprocessor systems, microprocessor-based or programmable consumer electronics, minicomputers, mainframe computers, and the like. The features may also be practiced in distributed computing environments where tasks are performed by remote processing devices that are linked through a communications network. In a distributed computing environment, program modules may be located in both local and remote computer storage media including memory storage devices.

With reference to FIG. 1, the exemplary system 100 for implementing features described herein includes a general purpose-computing device in the form of a computer 110 including a processing unit 120, a system memory 130, and a system bus 121 that couples various system components including the system memory to the processing unit 120.

Computer 110 may include a variety of computer readable media. By way of example, and not limitation, computer readable media may comprise computer storage media and communication media. The system memory 130 may include computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, may be stored in ROM 131. RAM 132 may contain data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 may be connected to the system bus 121 through a non-removable memory interface such as interface 140, and magnetic disk drive 151 and optical disk drive 155 may be connected to the system bus 121 by a removable memory interface, such as interface 150.

The drives and their associated computer storage media discussed above and illustrated in FIG. 1 may provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. The video interface 190 may be bidirectional, and may receive video input from sensors associated with the monitor 191. For example, the monitor 191 may be touch and/or proximity sensitive, such that contacts to a monitor surface may be used as input data. The input sensors for affecting this could be a capacitive touch sensitive device, an array of resistive contact sensors, an optical sensor or camera, or any other desired sensor to make the monitor 191 touch and/or proximity sensitive. In an alternative arrangement, or in addition, a touch and/or proximity sensitive input system may be separate from monitor 191, and may include a planar surface such as a table top surface 192 and any applicable sensing systems to make the planar surface touch sensitive, such as camera 193. In addition to the monitor 191, the computer 110 may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. Many of the features described herein may be implemented using computer-executable instructions stored on one or more computer-readable media, such as the media described above, for execution on the one or more units that make up processing unit 120.

Figure 2:
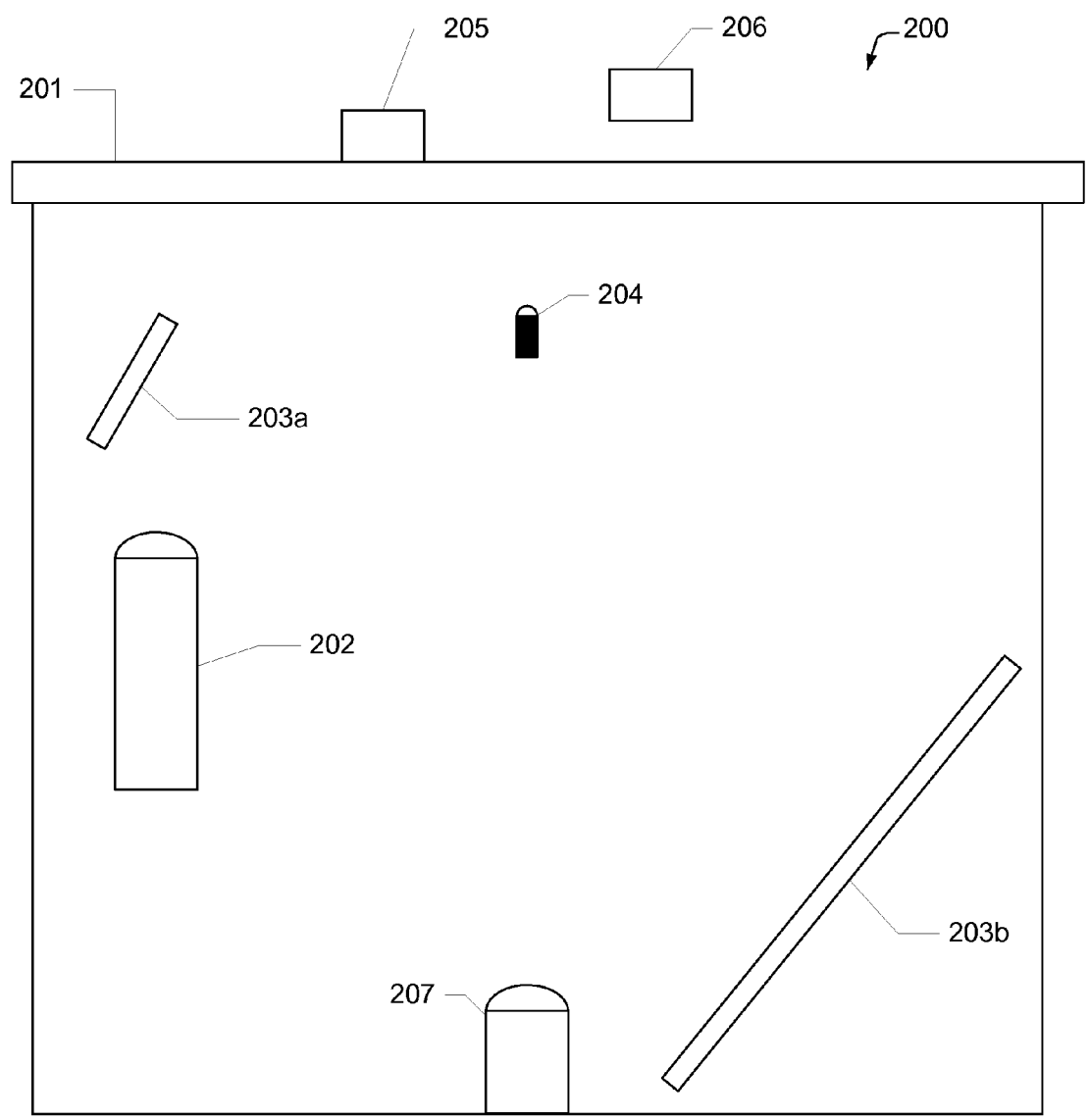
FIG. 2 illustrates an example optical detection system that may be used as a display to implement features described herein.

The computing device shown in FIG. 1 may be incorporated into a system having table display device 200, as shown in FIG. 2. The display device 200 may include a display surface 201, which may be a planar surface such as the table top 192. As described hereinafter, the display surface 201 may also help to serve as a user interface.

The display device 200 may display a computer-generated image on its display surface 201, which allows the device 200 to be used as a display monitor (such as monitor 191) for computing processes, displaying graphical user interfaces, television or other visual images, video games, and the like. The display may be projection-based, and may use a digital light processing (DLP—trademark of Texas Instruments Corporation) technique, or it may be based on other display technologies, such as liquid crystal display (LCD) technology. Where a projection-style display device is used, projector 202 may be used to project light onto the underside of the display surface 201. It may do so directly, or may do so using one or more mirrors. As shown in FIG. 2, the projector 202 in this example projects light for a desired image onto a first reflective surface 203a, which may in turn reflect light onto a second reflective surface 203b, which may ultimately reflect that light onto the underside of the display surface 201, causing the surface 201 to emit light corresponding to the desired display.

In addition to being used as an output display for displaying images, the device 200 may also be used as an input-receiving device. As illustrated in FIG. 2, the device 200 may include one or more light emitting devices 204, such as IR light emitting diodes (LEDs), mounted in the device's interior. The light from devices 204 may be projected upwards through the display surface 201, and may reflect off of various objects that are above the display surface 201. For example, one or more objects 205 may be placed in physical contact with the display surface 201. One or more other objects 206 may be placed near the display surface 201, but not in physical contact (e.g., closely hovering). The light emitted from the emitting device(s) 204 may reflect off of these objects, and may be detected by a camera 207, which may be an IR camera if IR light is used. The signals from the camera 207 may then be forwarded to a computing device (e.g., the device shown in FIG. 1) for processing, which, based on various configurations for various applications, may identify the object and its orientation (e.g. touching or hovering, tilted, partially touching, etc.) based on its shape and the amount/type of light reflected. To assist in identifying the objects 205, 206, the objects may include a reflective pattern, such as a bar code, on their lower surface. To assist in differentiating objects in contact 205 from hovering objects 206, the display surface 201 may include a translucent layer that diffuses emitted light, such as a semi-opaque plastic diffuser. Based on the amount of light reflected back to the camera 207 through this layer, the associated processing system may determine whether an object is touching the surface 201, and if the object is not touching, a distance between the object and the surface 201. Accordingly, various physical objects (e.g., fingers, elbows, hands, stylus pens, blocks, etc.) may be used as physical control members, providing input to the device 200 (or to an associated computing device).

The device 200 shown in FIG. 2 is illustrated as using light projection- and sensing techniques for the display of data and the reception of input, but other techniques may be used as well. For example, stylus-sensitive displays are currently available for use with Tablet-based laptop computers, and such displays may be used as device 200. Additionally, stylus- and touch- sensitive displays are available with many personal data assistants (PDAs), and those types of displays may also be used as device 200.

The device 200 is also shown in a substantially horizontal orientation, with the display surface 201 acting as a tabletop. Other orientations may also be used. For example, the device 200 may be oriented to project a display onto any desired surface, such as a vertical wall. Reflective IR light may also be received from any such oriented surface.

Figure 4:
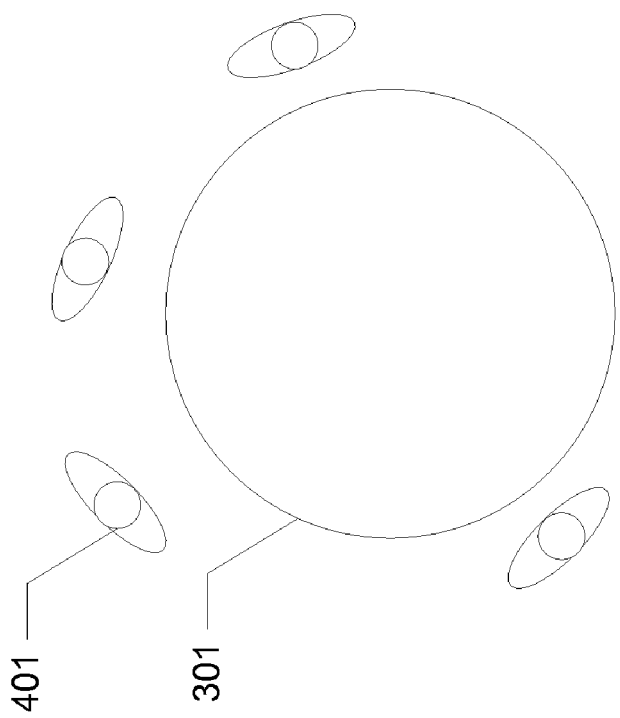
FIGS. 3 and 4 illustrate example table embodiments of the display shown in FIG. 2.
Figure 3:
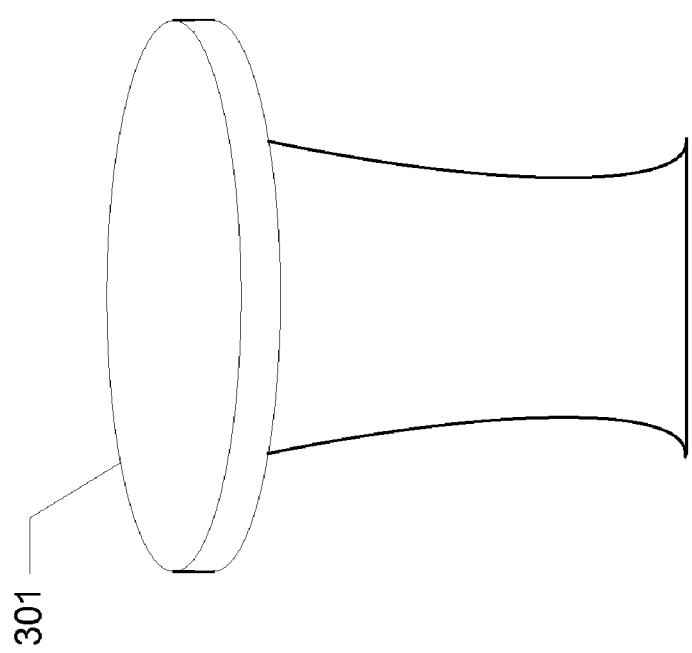

FIG. 3 illustrates an illustrative configuration of an implementation of the system shown in FIG. 2, in which device 301 is used as a tabletop display device. FIG. 4 illustrates an overhead view of such a table, around which a number of users 401 may be seated or standing. Each user 401 may wish to interact with the display on the surface of table 301, for example to place and/or move an object, or to play a multi-player video game. If the various players 401 wish to participate in the same game, using the same display area of table 301, there might not be an "up" or "down" that is common among all players. Although the display area of table 301 is shown in this example to be circular, it may be of any desired shape.

Figure 5:
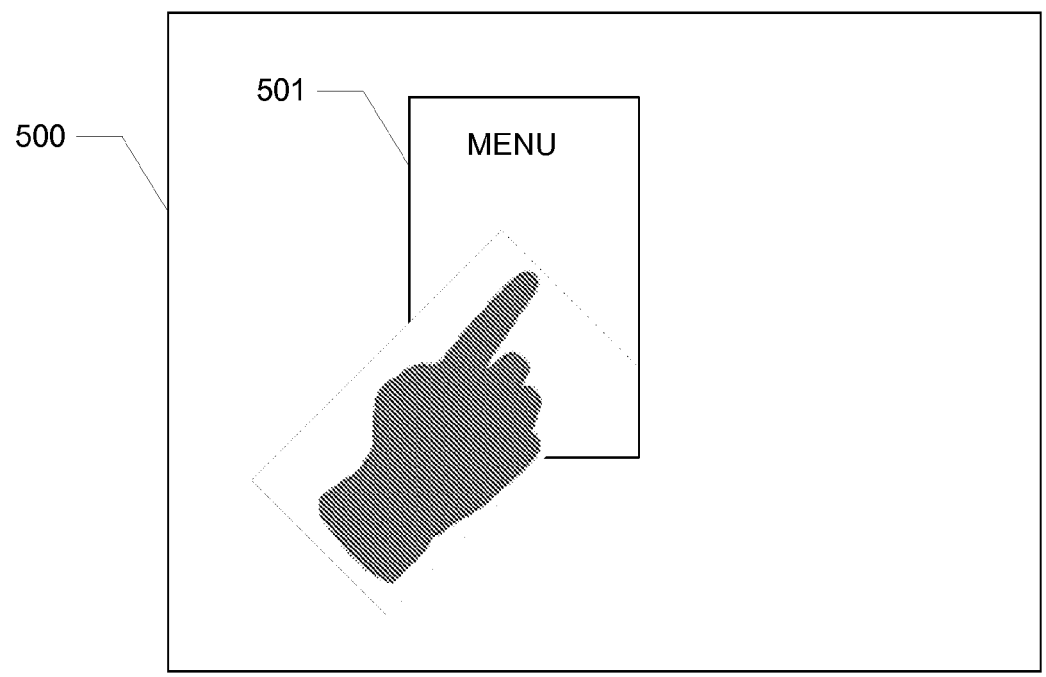
FIGS. 5 and 6 illustrate two examples of an interface being displayed centered about a point of contact.

FIG. 5 illustrates an example display interface 500 configured to detect the presence of objects, such as a user's hand or finger. A user may touch a location on the display's surface to request an onscreen user interface element, such as a menu 501. The menu 501 may be displayed at a location that depends on the location where the user's finger (or other object) touched the display. For example, the menu 501 may automatically center itself at the point where the user's finger touched the display, which may be useful if the display surface is large and used by different people.

Figure 6:
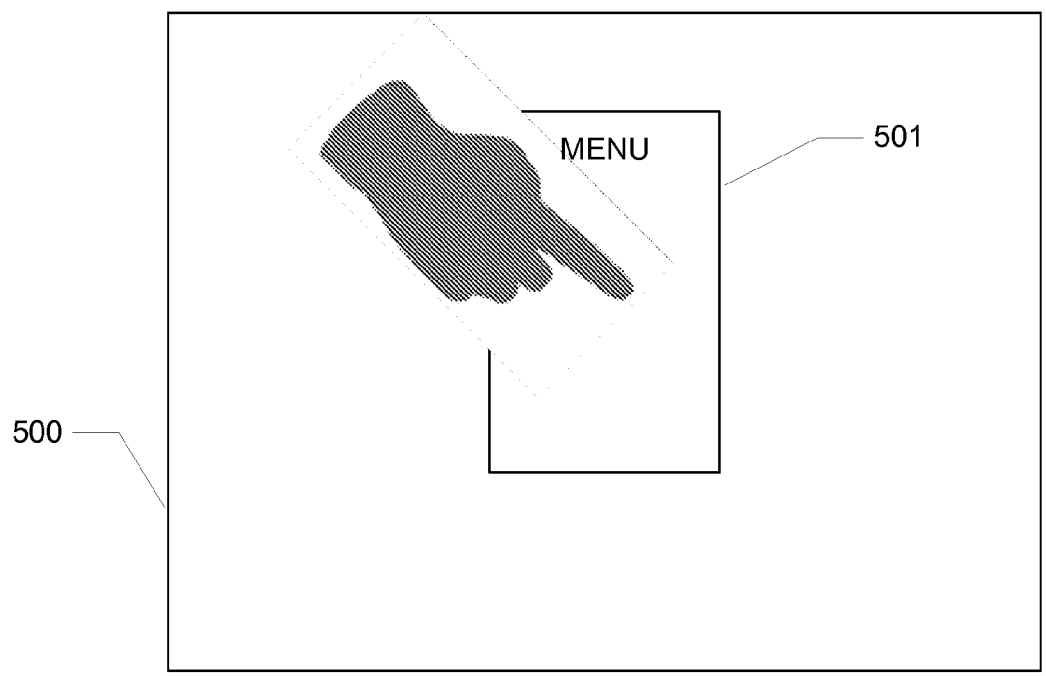

Automatically centering a requested user interface element at the point of contact may, however, result in the user's hand obscuring part of the displayed interface 501. Additionally, there remains the question of orientation. The user may have approached the table from a different side, such as shown in FIG. 6, and displaying the interface 501 as shown may leave the user with an upside-down view of the interface. Accordingly, while automatically opening a new interface centered at a point of contact is one possible approach, there are other alternatives that may be used as well.

Figure 7A:
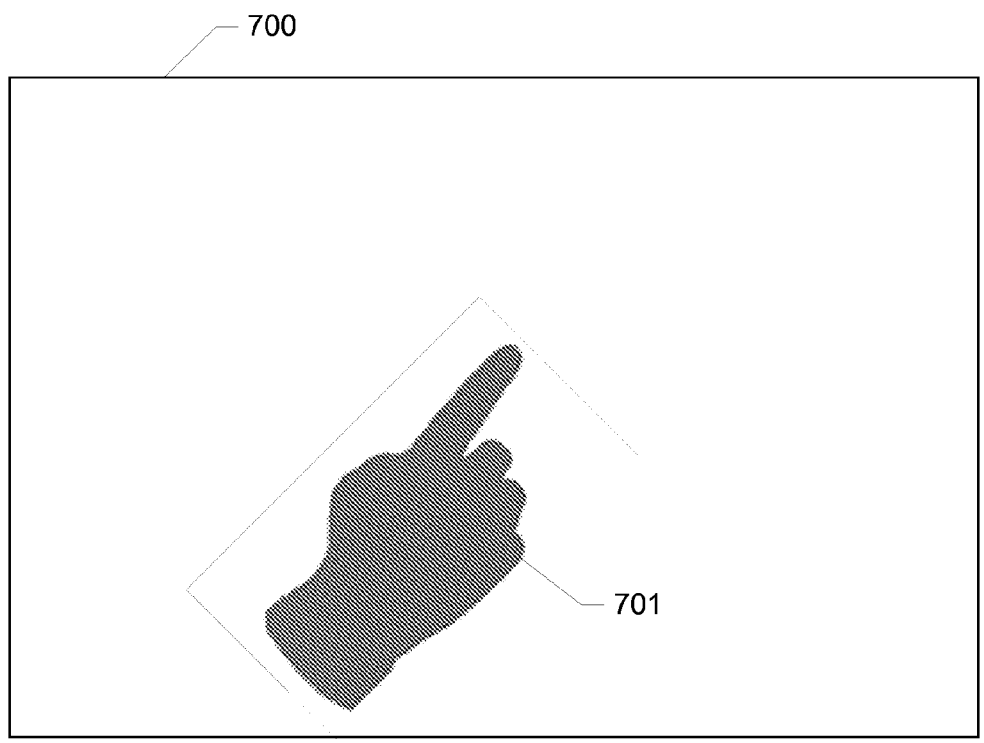
FIGS. 7A-C illustrate steps in receiving a contact point and associated shadow input.
Figure 7B:
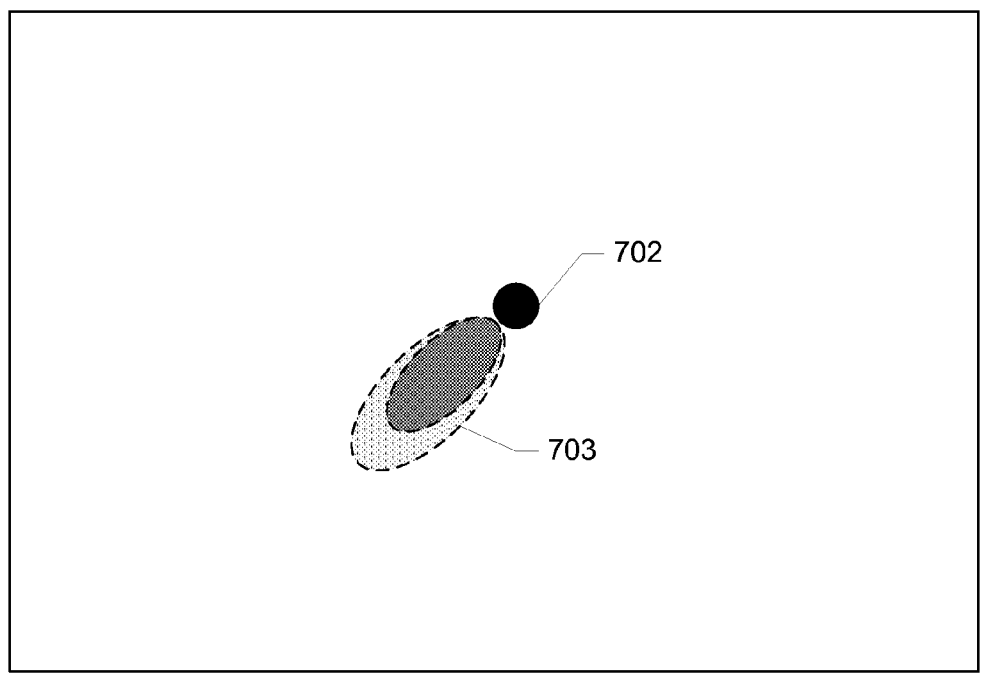

One such alternative involves shadows. FIG. 7A illustrates an example display 700, with a user's hand approaching and/or touching the display 700 to request the instantiation of a user interface element. The display 700 may be configured to optically detect objects that are on and/or above the display surface, such as that described earlier with respect to FIG. 2. When the user touches a point on the display, the display (or a computing system of the display) may detect the optical inputs shown in FIG. 7B. There, the user's finger may have touched the display at a contact area 702, and the other parts of the user's hand may have cast a shadow 703 that is also detected. The shadow may be a traditional shadow, such as that cast by an opaque object blocking visible light. Alternatively, the shadow may refer to an area on a display (or other surface) over which an object is detected (e.g., an object that is hovering, or otherwise positioned above the surface but not in contact). Such alternative shadows may be detected, for example, through detection of the infrared light emitted upwards by LEDs 204 and reflected back down. Contact points and shadows may be detected by comparing the relative brightness of the reflected IR light at various locations on the display. The display (and its operating system) may use this information to interpret and handle the user input.

Figure 7C:
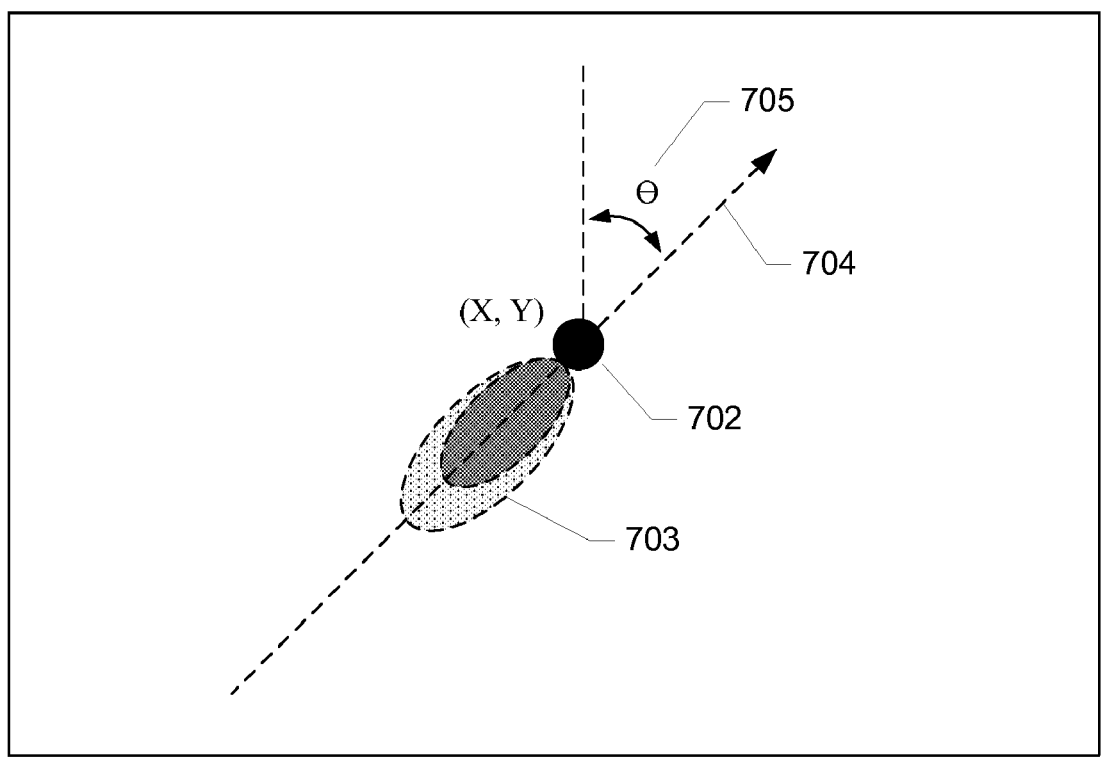

FIG. 7C illustrates example inputs that may be determined from the user input. The system may determine the onscreen coordinates (X,Y) of the user's contact with the screen. Since many objects and fingers are larger than a single pixel on the display, the point of contact may be represented as ranges or multiple points defining the full area of contact (e.g., the user's fingertip). Alternatively, the point of contact may be assigned to a single representative point or pixel, for example, by detecting the center of mass of the area of contact. For example, if the user's fingertip formed a circle centered about point (100, 200) on the display, then point (100, 200) could be treated as the point, or pixel, of contact. As another alternative, the system may determine which point or pixel in the overall contact area was first detected as a contact, and that first point or pixel may be considered the point of contact.

When a contact is made, the system may also detect the shadow 703 cast by the object making the contact with the display. To detect a shadow, the system may compare light strength or brightness values of pixels surrounding the point of contact, and may identify those pixels receiving dimmer light. For example, some detection systems may use reflected light from below to determine proximity, such that the areas reflecting the most light (brightest) correspond to the point of contact, and areas reflecting less light (darker) correspond to the shadow (in such embodiments, an object's shadow need not depend on the light shadow cast from lights in the room). The system may identify the range of pixels that comprise the shadow 703, and may also identify a single representative (e.g., central) point, or pixel, of the shadow 703. This may be another center of mass calculation. Alternatively, the system may check to find the darkest point within the shadow 703, and assign that point as the representative point of the shadow. This may be helpful, for example, when the ambient light in the room contains multiple light sources.

The system may also calculate a shadow axis 704 as a line extending from the shadow 703 to the contact area 702 and beyond. The shadow axis may, for example, connect the representative or central point of the shadow 703 with the point of contact of the contact area 702. The axis 704 need not be displayed, although it may be if desired. For example, the shadow axis may be displayed prior to actually rendering the element, giving the user feedback on the orientation that is about to be used. The system may also calculate an angle θ 705 of the axis 704, as measured with respect to any desired frame of reference. For example, the angle shown in FIG. 7C is measured with respect to the vertical edges (e.g., left and right) shown in that figure.

The contact point, shadow, axis and/or axis angle may be used to determine how a requested user interface element will appear on the display. A requested user interface element may be placed at a location that depends on the determined point of contact, and oriented at an angle corresponding to, or depending on (or equaling), the axis angle 705.

Figure 8:
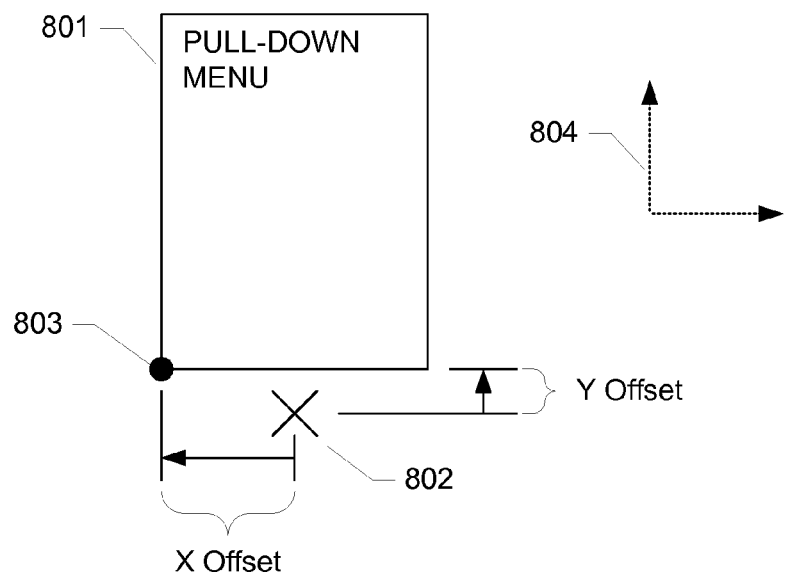
FIG. 8 illustrates example parameters used in defining a user interface element.

Such placement and orientation are made possible by definition information used to initially define the user interface element (e.g., prior to its actual use in the system). FIG. 8 depicts an example user interface element 801 that may be defined in advance of the user's request for the element. The element 801 may be any type of user interface element, such as a pop-up display, a pull-down menu, a control panel, etc. As for placement, the element 801 may be defined as having a predetermined vertical (Y) and horizontal (X) offset from an anticipated contact point 802. The offset may be measured using any desired origin point for the element 801 (e.g., the upper-left corner, lower-left corner, etc.). The FIG. 8 example uses the lower-left corner of the interface element 801 as origin 803.

The element 801 may be defined with respect to a reference coordinate system 804 (e.g., having X- and Y- dimensions and coordinates using system 804 as the frame of reference in a Cartesian coordinate system, or using any other desired coordinate system). As illustrated in the FIG. 8 example, the element 801 is defined as having its origin 803 located a distance of <Y Offset> above the anticipated contact point 802, and a distance of <X Offset> to the left of the contact point 802. The data defining the element 801 (e.g., image data, placement/offset data, interactive controls, etc.) may be stored as part of a computer operating system or application in any of the computer-readable media shown in FIG. 1.

Figure 9:
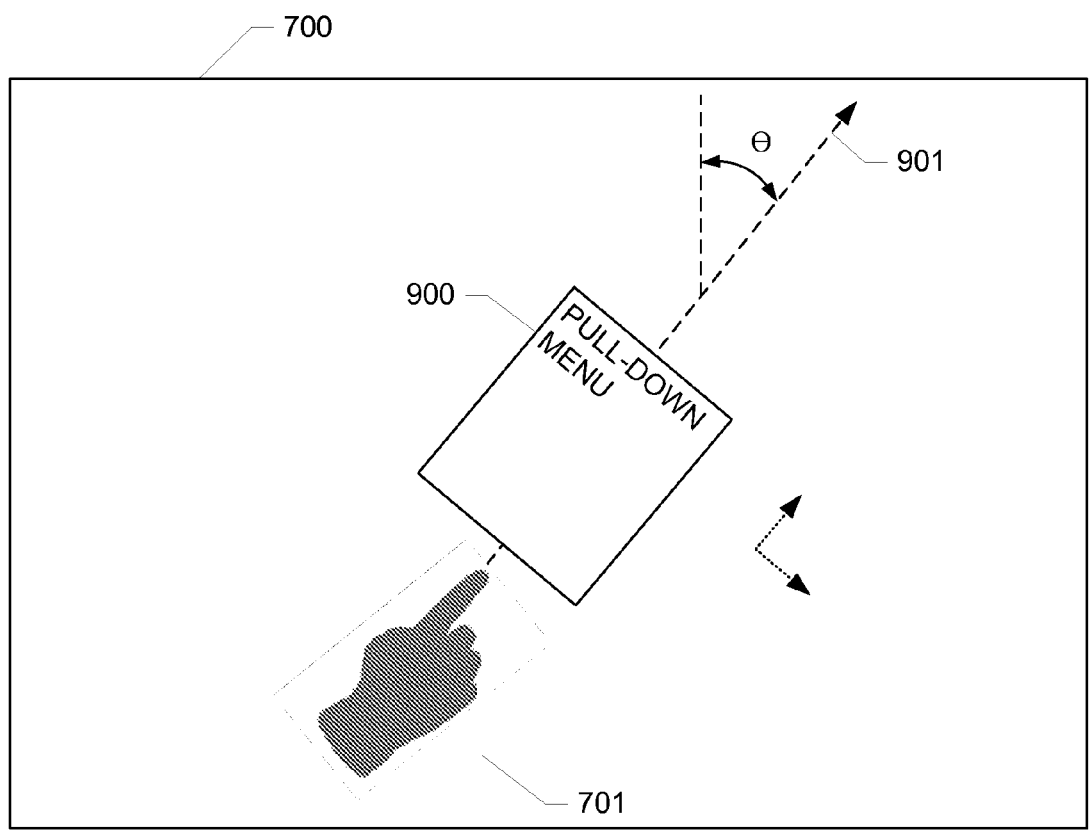
FIG. 9 illustrates how the parameters in FIG. 8 can be used to render an element in response to a request having a contact and shadow.

FIG. 9 illustrates how this user interface element may be displayed following a user request. When a user's hand 701, for example, contacts the display 700 to request the element, the shadow axis 901 may be determined using the point of contact and shadow of the hand as discussed above. The element 900 may then be rendered using a rotated frame of reference—the rotation corresponding to the angle θ of the axis 901. The offsets used to define the location of the element may also be used to offset the element 900 from the point of contact, using the rotated frame of reference.

Figure 10A:
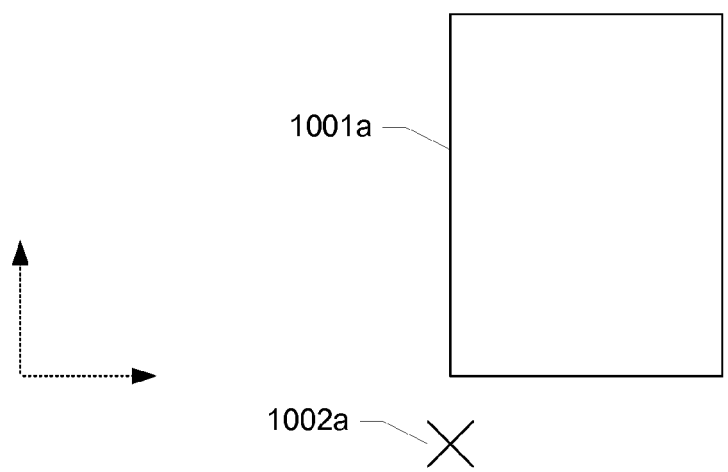
FIGS. 10A-C illustrate example offset parameters usable in defining an interface element.
Figure 10B:
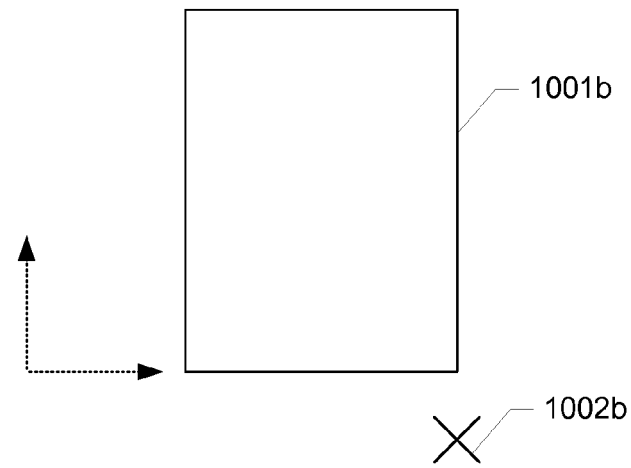

As noted above, a user interface element may be defined using one or more offsets from a point of contact. The FIG. 8 example uses the lower-left corner of a rectangular interface as an origin from which the X- and Y- offsets are measured. FIG. 10A shows an example in which the user interface element 1001a is aligned (on the horizontal axis) with a contact point 1002a, and located a short distance above (on the vertical axis) the contact point. FIG. 10B illustrates an alternative example, in which the lower-right corner of a user interface element 1001b is aligned with the contact point 1002b (horizontally), and located slightly above the contact point 1002b.

Figure 10C:
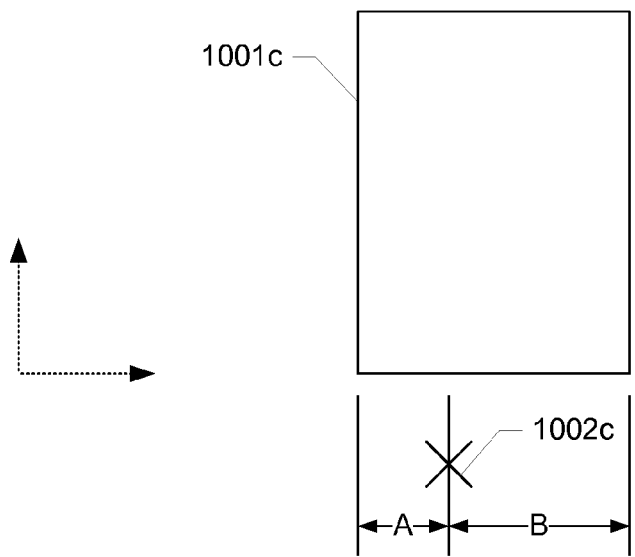
Figure 11A:
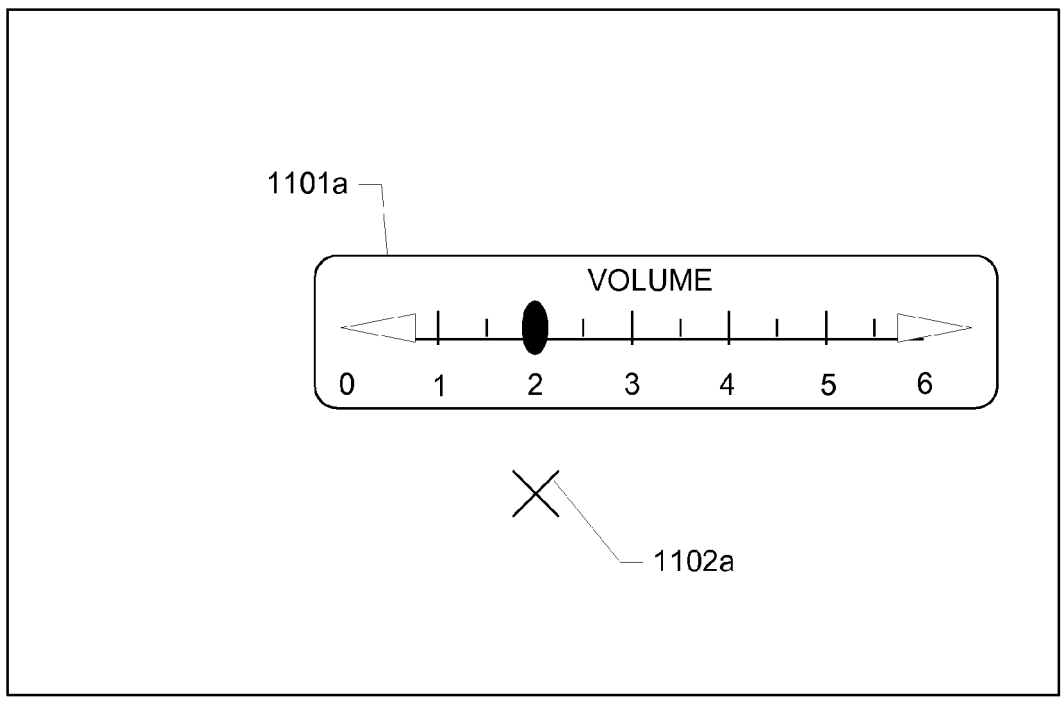
FIGS. 11A-E illustrate example interface elements placed using contact and shadow inputs.
Figure 11B:
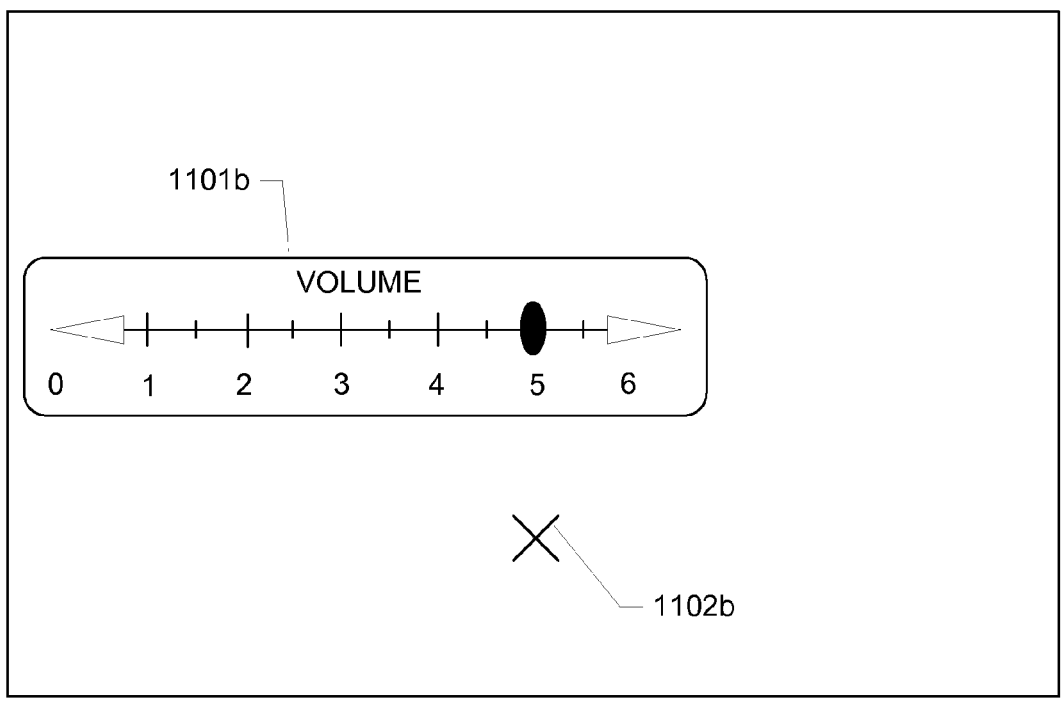

The offsets may each be a predetermined fixed value (e.g., 100 pixels, one inch, etc.). Alternatively, the offsets may each be a variable value. FIG. 10C illustrates an example, in which the left edge of an element 1001c extends a first distance A to the left of a contact point 1002c, while the right edge of the element extends a second distance B in the opposite direction, to the right of the contact point 1002c. The values for A and/or B may vary, for example, depending on a current system status or configuration. For example, FIGS. 11A and 11B show two examples of an interface element 1101a, b that may be used to adjust the audio volume of a music player. The user may have requested the volume interface by touching a desired location on the screen, resulting in a contact point 1102a. The volume control software, upon detecting the request, may first check to see what the current volume setting is in the music player. The software may adjust the distance values of A and/or B (from FIG. 10C) such that the contact point 1102a appears positioned at the current volume level along the volume scale (in the interface's X-axis) contained in the volume control interface 1101a. So, for example, if the current volume level had been set at "2" when the request was made, the software may adjust the A and B values such that the contact point 1102a is aligned with the "2" setting on the volume scale when the interface 1101a is rendered.

If, alternatively, the volume setting had been higher, such as at a setting of "5", when the request was made, the software may use different values for A and B such that the contact point 1102b is aligned with the current volume level in the volume control interface element 1101b. FIG. 11B illustrates such an example. Accordingly, the interface elements 1101a, b may appear at slightly different locations depending on the current setting of a system value.

Figure 11C:
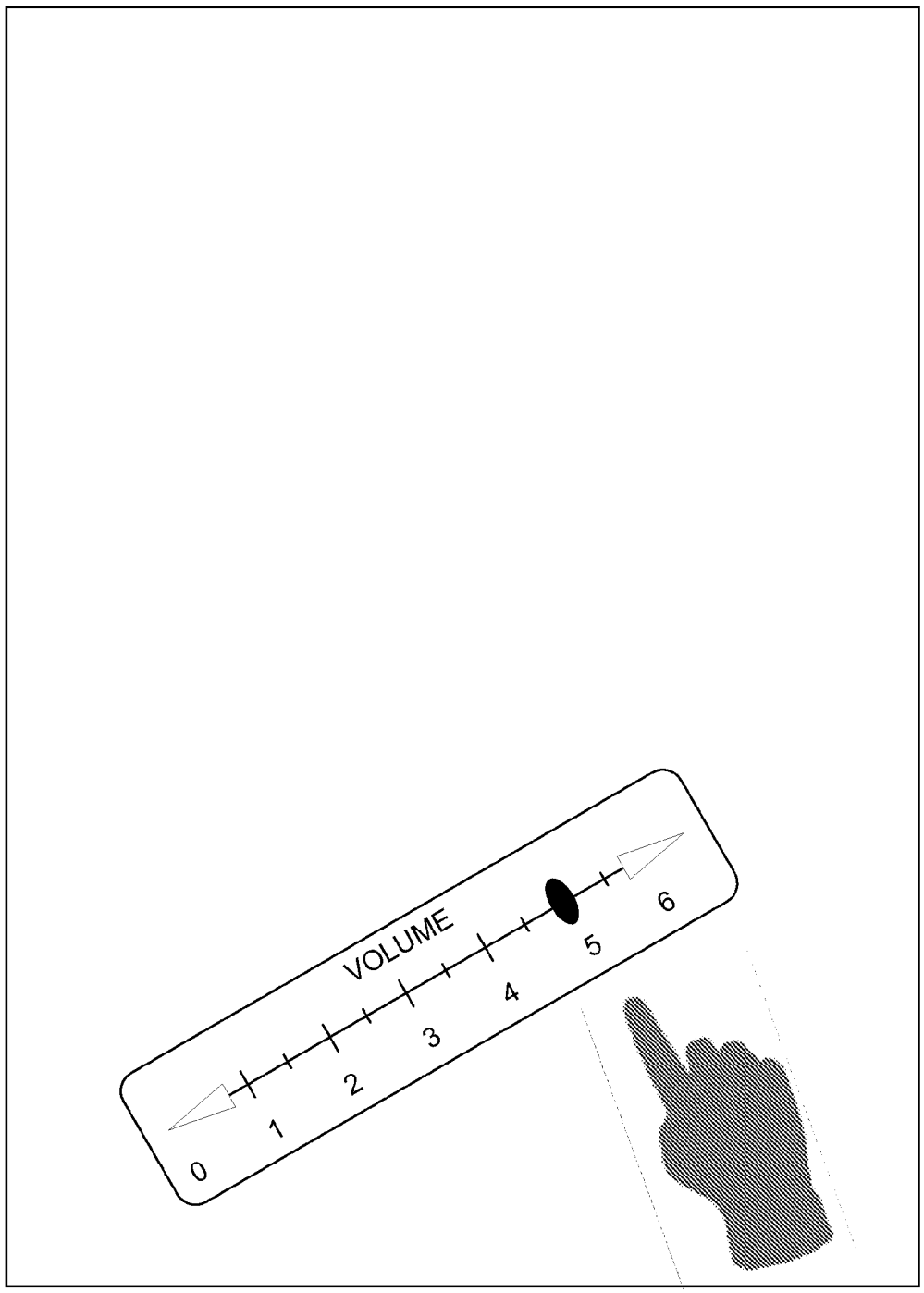

The volume control example above illustrated a shifting of the interface along one axis (i.e., the X-axis of the interface), although shifting along more than one axis is also possible if desired. For example, the interface could also adjust its Y-axis location based on another parameter. Additionally, the axis (or axes) of the interface (including the axis of the shifting) may be rotated by or to an angle depending on the shadow axis rotation described above, such that a user can approach the display from any angle and request, for example, a volume control interface element that appears horizontally aligned from that user's point of view. FIG. 11C shows such an example.

Figure 11D:
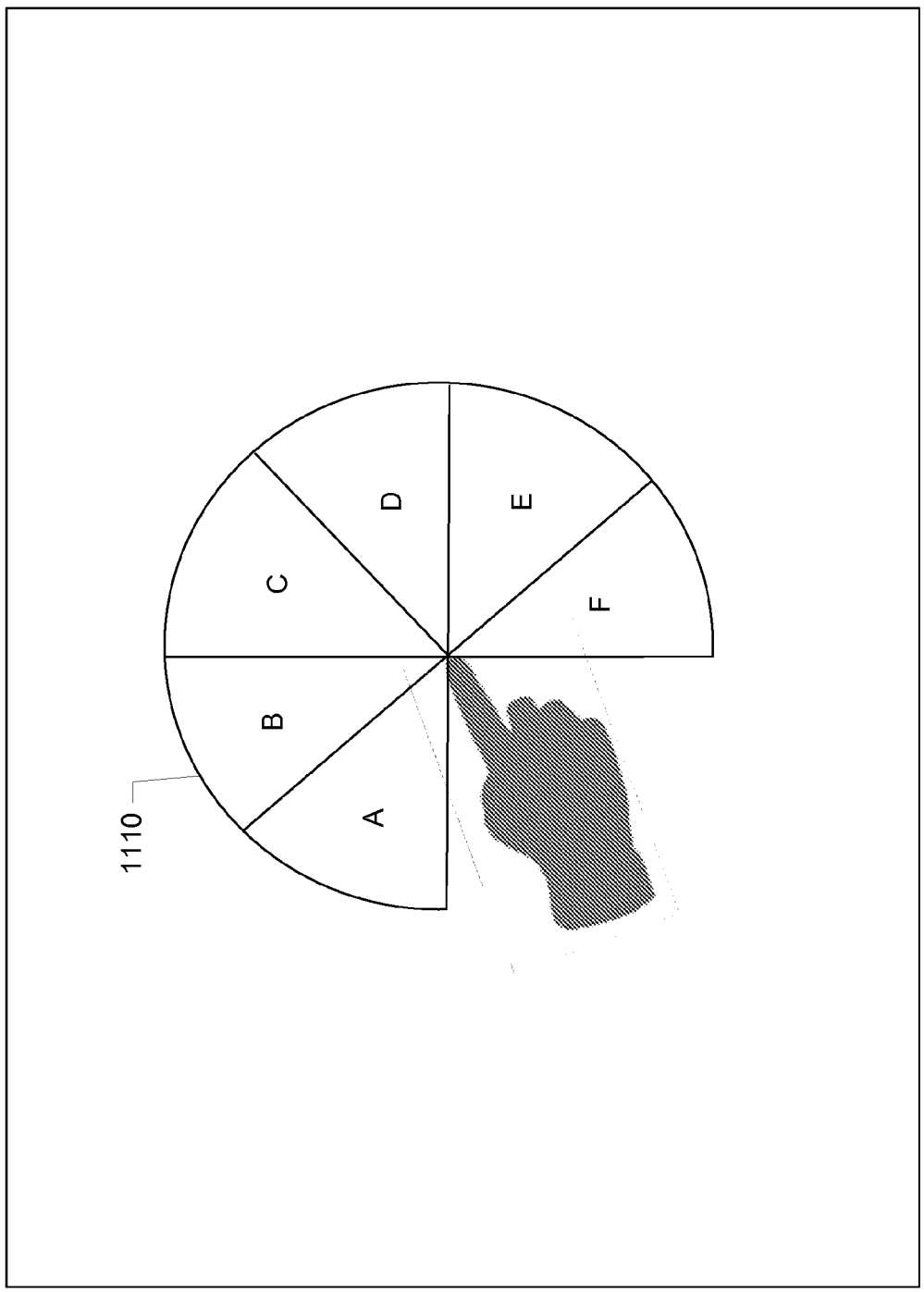

Once a requested interface is rendered at the desired position and orientation, the interface may maintain that position for further interaction. In the volume control example described above, the volume control interface 11a, b may remain anchored at its initial position, allowing the user to further adjust the volume by sliding his/her finger along the axis of volume control. Although the example above describes a volume control, the same features may be applied to other types of interfaces, such as other slider controls (graphic equalizer settings, video color settings, brightness settings, etc.), pull-down menus, two-dimensional grids, etc. Another example involves a two-dimensional radial interface element 1110, such as that shown in FIG. 11D. There, the interface element 1110 may be circular (or semi-circular), and may have the contact point at a central location. The interface 1110 may offer the user a number of selectable options (e.g., options A-F), and the user may select an option by moving his/her finger from the contact point towards the radial portion (e.g., pie wedge) corresponding to the option.

Because some applications allow users to request interfaces at various locations on the display, it is possible that some users may place a contact point close to the edge of the display, such that the normal offset and shadow axis rotation features described above may cause the interface to partly (or wholly) appear off of the display. Alternatively, there may be other objects resting on the display surface, or graphical elements displayed in the surface, that the resulting interface should avoid overlapping. In these instances, the computer system may further include instructions on how to adjust the position of the requested element if it overlaps or runs off the edge of the display. For example, the interface element may be defined to have one or more default movement axes, and may automatically move along the axis (axes) to avoid overlapping or running off the page. For example, an interface may be defined such that it is automatically moved perpendicularly away from an edge of the display (or away from another object/element) by a sufficient distance such that it no longer runs over the display (or overlaps the object/element). The interface element may also rotate to avoid a display edge or another object/element. These "movements" and "rotations" may be rendered on the display, or they may occur invisibly to generate the final result on the screen.

Figure 11E:
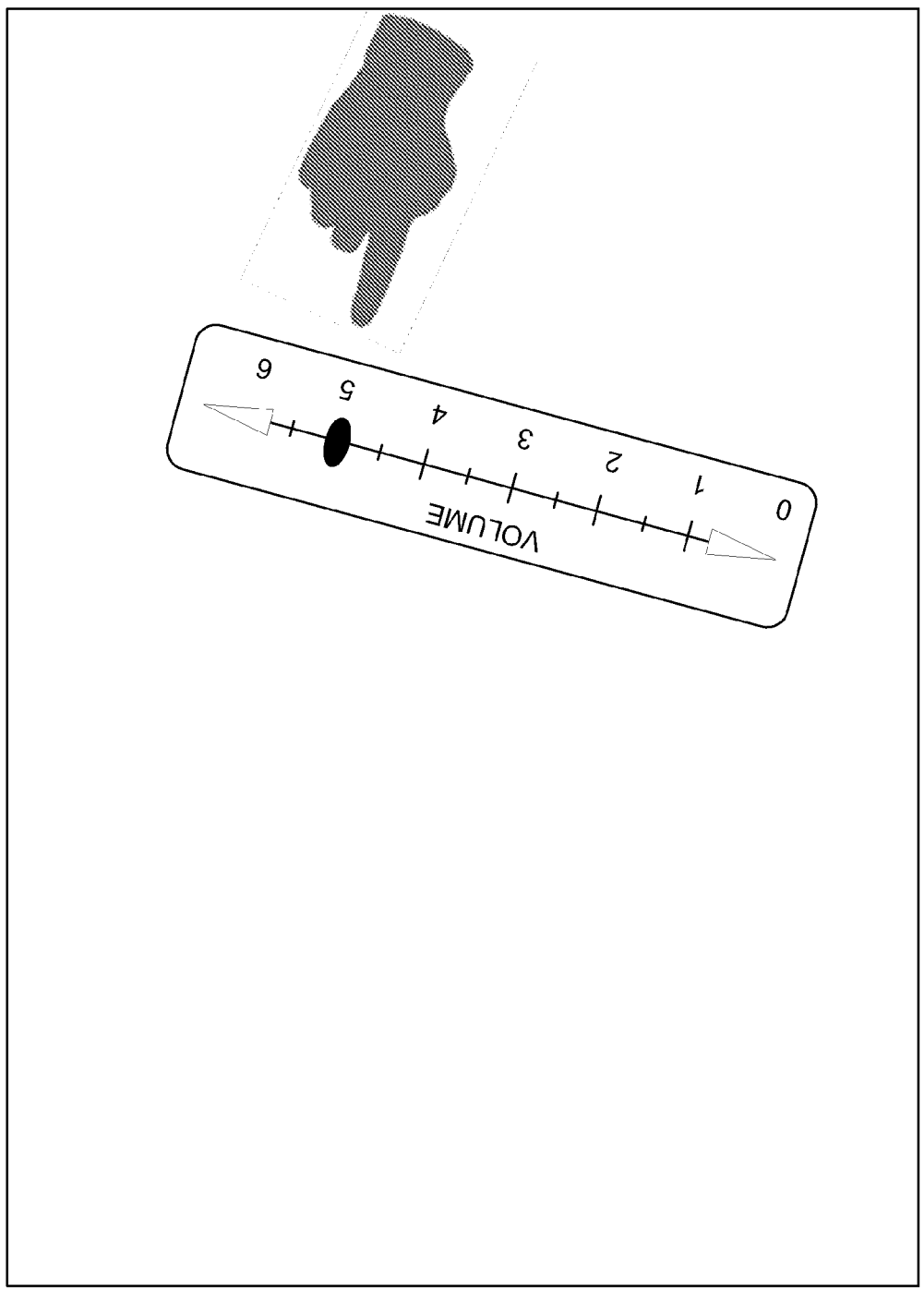

As a further feature, changes in the shadow axis may result in further rotation of the displayed element. For example, after the interface element has initially been displayed, the user may change the orientation of his/her hand (e.g., by walking around the table to another side), and the system may continuously or periodically monitor the progress and change in the shadow axis, and may rotate the interface element accordingly. FIG. 11E shows an example in which the user, from FIG. 11C, has repositioned his/her finger and moved to another side of the display, with the interface element moving and rotating accordingly. As noted previously, some implementations may anchor the interface element after it is initially displayed. Such systems may still move and/or rotate the interface if, for example, the user provides another input indicating that he/she would like the interface to track movement. The other input could be, for example, the placing of another object on an area of the screen, the entry of a predetermined keyboard command, a spoken command, a gesture, etc. Similarly, the user may enter an input to toggle the interface between anchored and free-moving modes.

Figure 12:
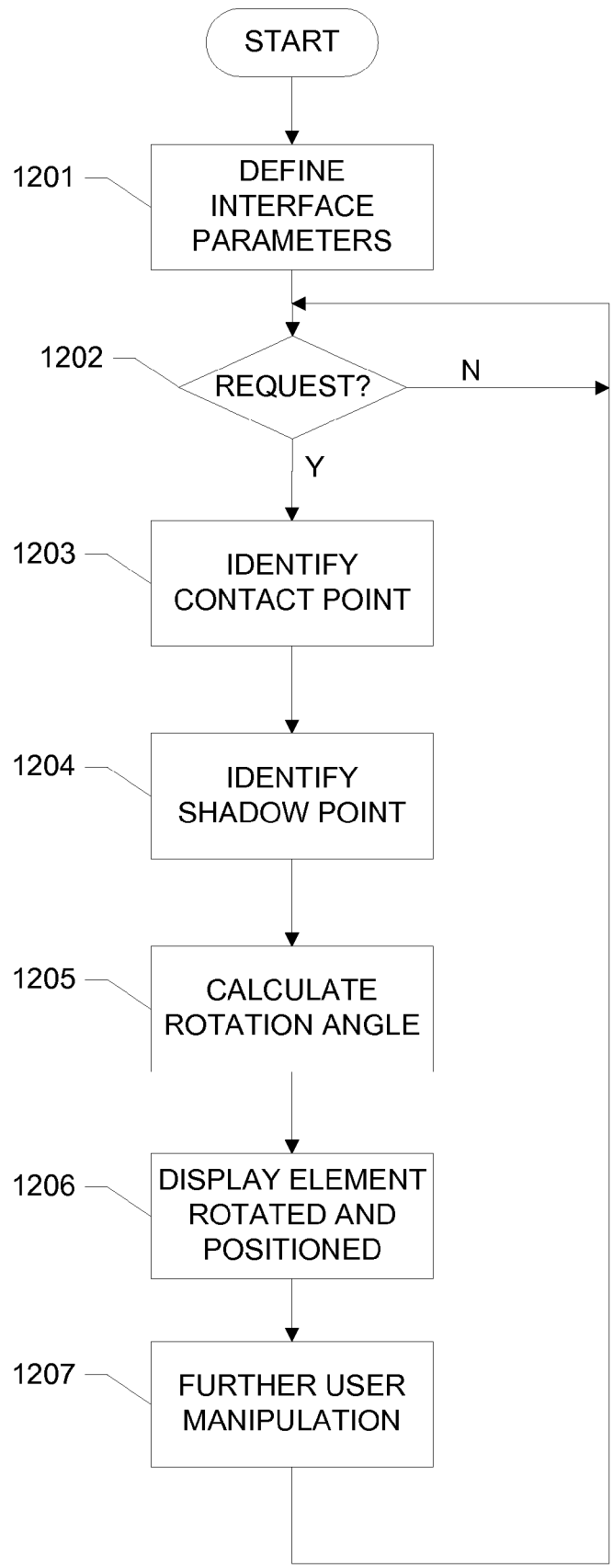
FIG. 12 illustrates an example process for implementing various features described herein.

FIG. 12 depicts an example process in which various features described above may be implemented. In step 1201, the user interface element parameters are predefined and stored in one or more computer-readable media, such as a memory. This may include the creation of the actual image data to be used when rendering the element, such as its colors, size, etc. The parameters may also include X- and/or Y-offset distances (or other analogous offset parameters appropriate for the desired coordinate system) and origin identification to be used when displaying the element, as well as object/edge avoidance parameters (e.g., direction to move to avoid overlap, types of objects where overlap is to be avoided, etc.).

With the element defined, the process may move to step 1202 to await a request for the element. The request can come in any desired manner. For example, some elements may be defined such that they are requested whenever a certain type of input is made on the display itself, such as a touch and hold of a finger, placement of a predefined object, touching/placing in a predetermined location on the display etc. Other inputs may also be used, such as a keyboard command, spoken command, foot pedal, etc. Still other inputs may originate as requests made by a software application or the operating system, as opposed to (or in addition to) the user.

If no request is made, the process may return to simply await a request. If a request is made, however, the process may move to step 1203 to identify a contact point of the request. The contact point is generally the location where the user has placed a finger (or other object) to indicate a location for the desired interface element, and may be a single point, pixel or an entire contact area.

The system may also, in step 1204, identify the shadow area of the finger/object used to make the contact. This may also be a single point or pixel. Based on the contact point and shadow, the system can make some high probability inferences about what sort of object is making the contact. In particular it is possible to infer with a high degree of accuracy that a contact is a finger touch by the shape, size and aspect ratios of the contact point (along with its shadow). For example, predefined shapes, sizes and/or aspect ratios may be stored in advance, and may be compared to a detected contact to identify matches.

With the contact point and shadow point, the system may then determine the shadow axis and calculate a rotation angle for the request in step 1205. The system may then move to step 1206, and generate the display of the requested element using the shadow axis as a vertical axis (e.g., rotating the element's frame of reference to align with the shadow axis), and using the offset data (if any) with respect to the point of contact. If desired, the element may also be positioned (or repositioned) to avoid extending beyond the displayable edge of the display surface, or to avoid overlapping other objects or display elements.

The system may also incorporate the user's handedness (e.g., left or right) when interpreting a shadow, and may include an angular offset to account for differences between a right- and left-hand input (e.g., a person's right hand touching a spot directly in front will cast a shadow extending down and right, and the system may incorporate an extra rotation of the element to account for that). The system may be pre-instructed as to the user's handedness (e.g., through a query to the user, predefined configuration parameter, etc.), or the system may determine the user's handedness by comparing the shape of the shadow with a predefined template of right- and left-hands.

When the requested element is displayed, the process may move to step 1207 to allow further use and/or manipulation of the element. For example, the user may interact with the element by moving a slider bar, selecting an element from a pull-down menu, or by rotating the element by changing the shadow axis (e.g., keeping a finger placed against the display while walking around an edge of a tabletop display). The process may then return to step 1202 to await another request for the element.

The discussion above refers to the use of shadows to infer orientation. Orientation can be inferred through other approaches as well. For example, an object may have a determinable orientation (e.g., a piece of paper, or a pattern printed on the bottom of a physical object). For example, the bottom of a physical object might have an arrow pointing "up." Rotating the physical object on the display can cause a corresponding rotation in the orientation of an associated interface element. The same can be done with the physical shape of an object (e.g., a physical object might be shaped like an arrow).

In alternative arrangements, a stylus may be used for input, and may include 3-dimensional sensing components to allow the system to detect the 3-dimensional orientation with which the stylus was held during the input. For example, the stylus may have a plurality of electromagnetic circuits responsive to one or more magnetic fields generated by the display, and the display may detect the positions of these circuits to infer the angle at which the stylus is being held.

As another alternative, the area of physical contact may be used itself to infer an orientation. For example, if the user places his/her finger against the screen, the area of contact may have a wider area towards the user's hand (i.e., the fingertip narrows). Detecting this wider area may allow the system to infer the direction from which the user's finger touched the display, and then use this information to determine the corresponding interface element orientation. Fingerprint patterns (e.g., the whorls, arches and loops) may also be detected and used to infer the orientation based on a predetermined fingerprint orientation.

As a further alternative, areas of the display may be preassigned to different orientations. For example, a rectangular display may be divided into quadrants by diagonals, and within each quadrant interface elements could be oriented to be read by a person located directly facing that quadrant.

Using one or more of the features and approaches described above, users' experiences with various orientations can be improved. Although the description above provides illustrative examples and sequences of actions, it should be understood that the various examples and sequences may be rearranged, divided, combined and subcombined as desired. For example, steps and features described may be omitted, or additional steps and features may be added. Accordingly, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim the following:

1. A method of orienting a user interface element on a computer display, comprising the steps of:
   detecting a point of physical contact on said computer display by a first portion of an object to cause a request for an interface element;
   detecting a shadow cast by a second portion of said object on said computer display;
   determining a representative point of said shadow cast by said second portion of said object;
   determining a shadow axis formed by said representative point of said shadow cast by said second portion of said object and said point of physical contact;
   determining an angular orientation of said shadow axis formed by said representative point of said shadow cast by said second portion of said object and said point of physical contact, wherein said angular orientation is based on a reference angle; and
   displaying said interface element on said display, wherein said interface element is displayed in accordance with said determined angular orientation of said shadow axis formed by said representative point of said shadow cast by said second portion of said object and said point of physical contact.

2. The method of claim 1, wherein said shadow axis runs between a pixel of said reference point of said shadow and a pixel of said point of contact.

3. The method of claim 1, further comprising the step of displaying said shadow axis on said computer display prior to said step of displaying said interface element.

4. The method of claim 1, wherein said step of displaying further comprises the step of aligning a vertical axis of said element with said shadow axis.

5. The method of claim 1, wherein said step of displaying further comprises the step of displaying said interface element at an offset from said point of physical contact, wherein said offset is applied based on said angular orientation of said shadow axis.

6. The method of claim 5, wherein said offset is a predetermined distance value.

7. The method of claim 5, wherein said offset is a variable value that depends on a current value of a variable setting.

8. The method of claim 7, wherein said interface element includes a slider bar having multiple selectable positions corresponding to different settings, and wherein said step of displaying further comprises the step of displaying said slider bar with said point of contact aligned with a current value of said variable setting.

9. The method of claim 8, wherein said slider bar is a menu.

10. The method of claim 1, further comprising the steps of:
    detecting a rotation of said detected shadow of said a second portion of said object; and
    rotating said interface element in accordance with said rotation.

11. The method of claim 1, further comprising the steps of:
    detecting further movement of said object; and
    moving said interface element in accordance with said movement.

12. The method of claim 1, wherein said interface element is a radial selection menu displayed proximal said area of contact, and said method further comprises the steps of:
    detecting a movement of said object; and
    selecting an option from said menu based on said movement of said object.

13. One or more computer-readable media storing computer executable instructions for performing the following steps:
    detecting a point of physical contact on a user interface by a first portion of an object to cause a request for an interface element;
    detecting a shadow cast by a second portion of said object on said user interface;
    determining a representative point of said shadow cast by said second portion of said object;
    determining a shadow axis formed by said representative point of said shadow cast by said second portion of said object and said point of physical contact;
    determining an angular orientation of said shadow axis formed by said representative point of said shadow cast by said second portion of said object and said point of physical contact;
    displaying said interface element on said user interface, wherein said interface element is displayed in accordance with said determined angular orientation of said shadow axis formed by said representative point of said shadow cast by said second portion of said object and said point of physical contact.

14. The one or more computer-readable media of claim 13, further storing computer-executable instructions for performing the following steps:
    determining a position offset for said user interface, said position offset being measured from said point of contact; and
    applying said offset position in said step of displaying.

15. The one or more computer-readable media of claim 14, wherein said position offset is variable based on a system setting.

16. The one or more computer-readable media of claim 15, wherein said step of applying results in aligning said point of contact with a current value of said system setting.

17. The one or more computer-readable media of claim 13, further storing computer-executable instructions for adjusting a positioning of said interface to avoid overlapping another object or extending beyond said display.

18. The one or more computer-readable media of claim 13, further storing computer-executable instructions for performing the following steps:
    maintaining a position of said interface on said display after said step of displaying; and
    detecting further movement of said object with respect to said displayed interface as an input to said interface.

19. A method of orienting a user interface element on a computer display, comprising the steps of:
  detecting a point of physical contact on said computer display by a first portion of an object to cause a request for an interface element;
  detecting a shadow cast by a second portion of said object on said computer display;
  determining a representative point of said shadow cast by said second portion of said object;
  determining a shadow axis formed by said representative point of said shadow cast by said second portion of said object and said point of physical contact;
  determining an angular orientation of said shadow axis formed by said representative point of said shadow cast by said second portion of said object and said point of physical contact, wherein said angular orientation is based on a reference angle;
  displaying said interface element on said display, wherein said interface element is aligned with said shadow axis by rotating a frame of reference of said interface element based on said reference angle, and wherein said interface element is offset from said point of contact in accordance with a predefined offset parameter; and
  maintaining said interface element at an initial position while detecting further movement of said object with respect to said element.

20. The method of claim 19, wherein said offset varies with a variable system setting.

* * * * *